(12) United States Patent
Yokoyama et al.

(10) Patent No.: US 8,305,746 B2
(45) Date of Patent: Nov. 6, 2012

(54) ELECTRONIC APPARATUS

(75) Inventors: Yuichi Yokoyama, Nara (JP); Tetsuya Kawamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 12/696,249

(22) Filed: Jan. 29, 2010

(65) Prior Publication Data

US 2010/0195276 A1    Aug. 5, 2010

(30) Foreign Application Priority Data

Feb. 2, 2009   (JP) ................................. 2009-021710
Feb. 2, 2009   (JP) ................................. 2009-021711

(51) Int. Cl.
*G06F 1/16*    (2006.01)
(52) U.S. Cl. ..................... 361/679.27; 362/85; 362/253; 362/257; 362/561; 361/679.26; 349/58
(58) Field of Classification Search .............. 361/679.27
See application file for complete search history.

(56) References Cited

U.S. PATENT DOCUMENTS

| | | | |
|---|---|---|---|
| 5,684,513 A * | 11/1997 | Decker ........................ | 345/168 |
| 5,815,225 A * | 9/1998 | Nelson ........................ | 349/65 |
| 6,161,944 A * | 12/2000 | Leman ........................ | 362/276 |
| 6,474,823 B1 * | 11/2002 | Agata et al. .................. | 362/26 |
| 6,561,668 B2 * | 5/2003 | Katayama et al. ............. | 362/85 |
| 6,776,497 B1 * | 8/2004 | Huppi et al. .................. | 362/85 |
| 6,902,286 B2 * | 6/2005 | Hunter ........................ | 362/85 |
| 7,436,657 B2 * | 10/2008 | Motai et al. ................. | 361/679.55 |
| 7,686,466 B2 * | 3/2010 | Lev et al. .................... | 362/23 |
| 2001/0043188 A1 * | 11/2001 | Nakamura ..................... | 345/102 |
| 2007/0253182 A1 | 11/2007 | Motai et al. | |
| 2011/0007492 A1 * | 1/2011 | Sauer et al. .................. | 362/85 |

FOREIGN PATENT DOCUMENTS

JP    2007-299230 A    11/2007

* cited by examiner

*Primary Examiner* — Anthony Q Edwards
(74) *Attorney, Agent, or Firm* — Hamre, Schumann, Mueller & Larson, P.C.

(57) ABSTRACT

An electronic apparatus of the present invention includes a first case 1 including a keyboard 5 and a signal processing portion, a second case 2 including a liquid crystal display 21 that is capable of displaying visible information obtained by converting an input signal into a visible information signal in the signal processing portion, hinges 3 for rotatably supporting the first case 1 and the second case 2, and light source bodies 11, 12 that are capable of illuminating the keyboard 5 and located at both ends of the second case 2 in the axial direction of the hinges 3. With this configuration, the electronic apparatus can not only illuminate the input portion but also prevent light from entering the eyes of a user directly, thereby making it possible for the user to perform the input operation properly in a dark place.

6 Claims, 9 Drawing Sheets

ELECTRONIC APPARATUS

BACKGROUND OF THE INVENTION

1. Field of the Invention

The present invention relates to an electronic apparatus including a light source that is capable of illuminating an input portion.

2. Description of Related Art

In recent years, mobile equipment such as a notebook computer that is visible clearly in a dark place or at night has been desired. When the equipment is used in a dark place or the like, although the display portion (e.g., a liquid crystal display) can be seen easily, the input portion (e.g., a keyboard) is rather dark, making it difficult for a user to perform an input operation. To address this problem, a technology has been proposed that provides the equipment with a light source capable of illuminating the keyboard externally.

JP 2007-299230 A (Patent Document 1) discloses a configuration that includes an LED capable of illuminating the keyboard. The LED of Patent Document 1 is located in the central portion of the upper long side of a second case having a liquid crystal panel.

However, in the configuration of Patent Document 1, when the LED is turned on to make the keyboard visible in dark surroundings, the LED illuminates the keyboard, but both light emitted from the LED and light reflected from the surface of a key top that a user presses are likely to enter the eyes of the user directly. Thus, the intrinsic function of the keyboard illumination is reduced.

SUMMARY OF THE INVENTION

Therefore, with the foregoing in mind, it is an object of the present invention to provide an electronic apparatus that not only can illuminate the input portion but also prevent light from entering the eyes of a user directly, thereby making it possible for the user to perform the input operation properly in a dark place.

An electronic apparatus of the present invention includes the following: a first case including an input portion and a signal processing portion that processes an input signal received by the input portion; a second case including a display panel that is capable of displaying visible information obtained by converting the input signal into a visible information signal in the signal processing portion, and a frame that defines an effective display area of the display panel; and hinges having a rotation axis for rotatably supporting the first case and the second case. At least a pair of openings parallel to the rotation axis are provided in the frame, and at least a pair of light sources capable of illuminating the input portion are provided near or inside the pair of openings in the second case.

According to the present invention, the light sources can illuminate the input portion to make it visible in a dark place or the like, and thus the input operation can be performed properly. Moreover, light emitted from the light sources is not likely to enter the eyes of a user directly, so that a reduction in operability can be suppressed.

DETAILED DESCRIPTION OF THE INVENTION

An electronic apparatus of the present invention can have the following aspects based on the above configuration. In the electronic apparatus of the present invention, the light sources may be placed inside the second case at positions in which the light sources can illuminate the input portion. With this configuration, both light emitted from the light sources and light reflected from the input portion are not likely to enter the eyes of a user. Thus, the user can perform the operation of the electronic apparatus properly in a dark place or the like.

In the electronic apparatus of the present invention, light emitted from the light sources may illuminate at least the input portion when a rotation angle of the second case is in a range in which a user that operates the input portion can see the display panel. With this configuration, it is possible to attract the user's attention when the second case is rotated beyond the rotation angle at which the user can see the display panel easily. In the case where the emission centers of the light sources enter the user's vision, the user is dazzled and may have difficulty performing the operation while watching the display panel. Therefore, the user generally tries to rotate the second case back to a position in which the light sources do not shine into the eyes of the user. In the electronic apparatus with the above configuration, when the rotation angle of the second case is within the above range, the light sources illuminate the input portion. Moreover, when the second case is rotated beyond the rotation angle at which the user can see the display panel easily, the central axis of light emitted from each of the light sources is allowed to enter the user's vision. This can make the user rotate the second case to reduce the rotation angle of the second case relative to the first case so that the emission centers of the light sources are out of the user's vision.

In the electronic apparatus of the present invention, each of the light sources may include a light-emitting diode that emits red light. With this configuration, the eyes of the user can adapt to a dark place easily, since the red light emitted from the light-emitting diode does not interfere with the dark adaptation.

Embodiment

1. Configuration of Electronic Apparatus

Figure 1:
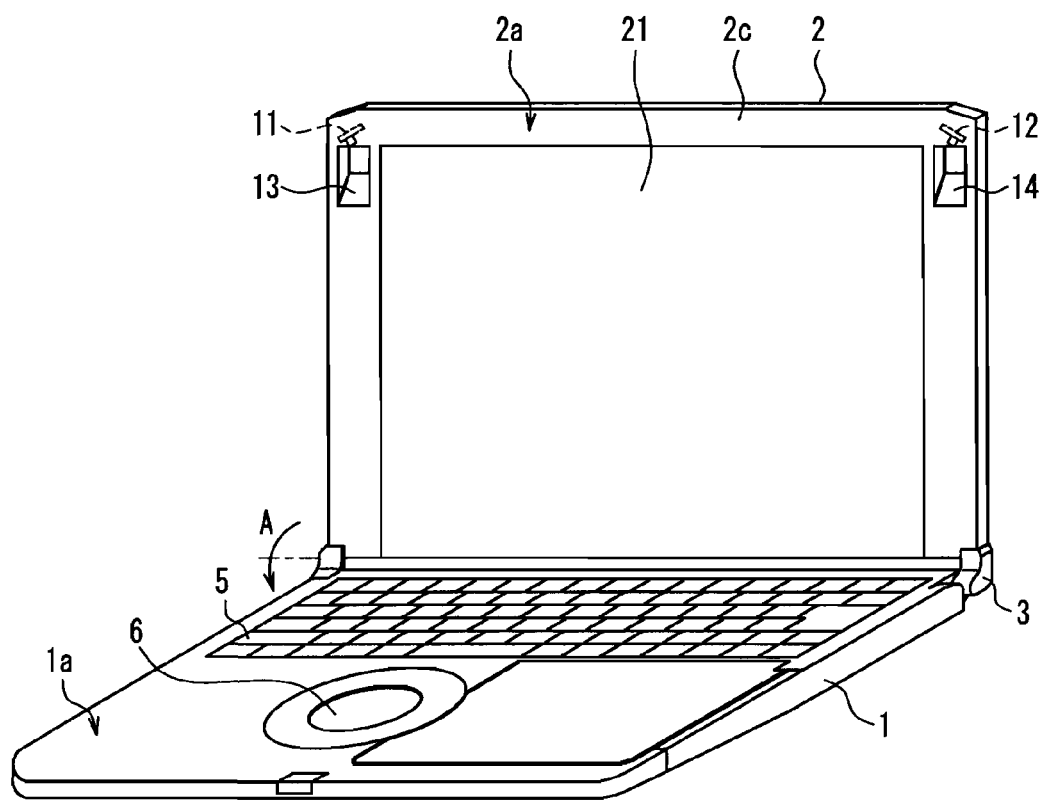
FIG. 1 is a perspective view of an electronic apparatus of an embodiment of the present invention.
Figure 2:
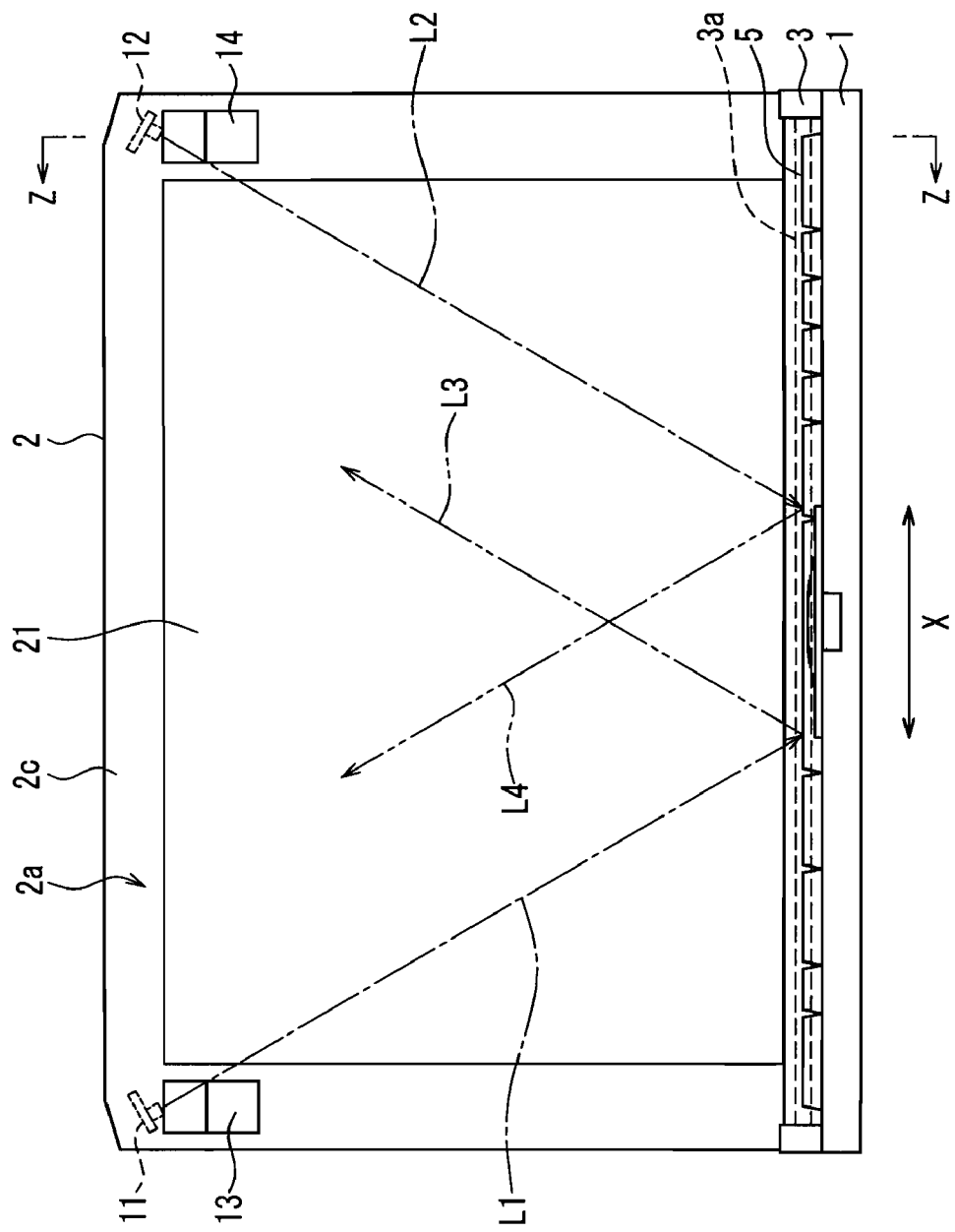
FIG. 2 is a front view of an electronic apparatus of an embodiment of the present invention.

FIG. 1 is a perspective view showing the appearance of a notebook computer as an example of an electronic apparatus of this embodiment. FIG. 2 is a front view of the notebook computer shown in FIG. 1. In this embodiment, the notebook computer is used as an example of an information processing unit. However, any electronic apparatuses such as a portable telephone and a portable game machine may be used as long as they have a display device and an input device.

As shown in FIGS. 1 and 2, the notebook computer includes a first case 1 and a second case 2. The first case 1 contains an electric circuit board on which an information processing circuit is mounted, a hard disk drive, etc. The second case 2 is provided with a liquid crystal display 21. The first and second cases 1, 2 are supported rotatably around a shaft (rotation axis) 3a held by hinges 3. When the second case 2 is rotated in the direction of the arrow A, it can be changed from the position in FIG. 1 (i.e., the first state) to the second state in which the liquid crystal display 21 faces a keyboard (input portion) 5. A frame 2c for defining the effective display area of a liquid crystal panel (display panel) is provided on a principal surface 2a of the second case 2. That is, the effective display area defined by the frame 2c is the liquid crystal display 21. When the surface of the first case 1 that faces the liquid crystal display 21 in the second state is defined as an "upper side", the keyboard 5 and a pointing device 6 are provided on an upper surface 1a of the first case 1. The keyboard 5 can be operated to input various characters and the pointing device 6 can be operated to move a cursor displayed on the liquid crystal display 21 to a desired position.

The information signals input/output from the keyboard 5 and the hard disk drive are subjected to predetermined processing in the information processing circuit (not shown) contained in the first case 1, and thus converted, e.g., into display signals to be displayed on the liquid crystal display 21.

In this embodiment, the upper surface 1a of the first case 1 and the principal surface 2a of the second case 2 are substantially rectangular in shape. One of a pair of long side portions of the first case 1 and one of a pair of long side portions of the second case 2 are supported by the shaft 3a. In the following description, the long side portion of each of the first and second cases 1, 2 that is supported by the shaft 3a is referred to as "a first long side portion", and the opposite long side portion is referred to as "a second long side portion".

2. Configuration of Light Source Body

As shown in FIGS. 1 and 2, the second case 2 includes light source bodies 11, 12 and recesses 13, 14. The light source body 11 and the recess 13 are located near the corner where the second long side portion and the left-hand short side portion of the second case 2 join. The light source body 12 and the recess 14 are located near the corner where the second long side portion and the right-hand short side portion of the second case 2 join. The light source bodies 11, 12 are contained in the second case 2. In this embodiment, each of the light source bodies 11, 12 includes a light-emitting diode (LED) that emits red light.

In FIG. 2, an alternate long and short dash line L1 schematically shows a central axis of light that is emitted from the light source body 11. An alternate long and short dash line L2 schematically shows a central axis of light that is emitted from the light source body 12. Moreover, an alternate long and two short dashes line L3 schematically shows a central axis of light that is emitted from the light source body 11 and reflected from a key top of the keyboard 5. An alternate long and two short dashes line L4 schematically shows a central axis of light that is emitted from the light source body 12 and reflected from a key top of the keyboard 5. In the following description, both the central axis of light that is emitted from the light source body and the central axis of light that is emitted from the light source body and reflected from the key top are referred to as an "optical axis", unless otherwise noted. As indicated by the optical axes L1, L2, the light emitted from the light source bodies 11, 12 illuminates the keyboard 5. Although not shown in FIG. 2, the light emitted from the light source bodies 11, 12 diffuses around each of the optical axes L1, L2 as a substantial center. Moreover, the reflected light from the keyboard 5 diffuses around each of the optical axes L3, L4 as a substantial center.

FIGS. 3A to 3D illustrate the vicinity of the light source bodies 11, 12 of the second case 2. The principal surface 2a of the second case 2, except for the recesses 13, 14 including the light source bodies 11, 12, is covered with the frame 2c. As is well known, the frame 2c defines the effective display area of the liquid crystal panel by covering the periphery of the liquid crystal panel with an opaque material. If the second case 2 is made of an opaque material, the second case 2 also can serve as a frame. A color material having a low light reflectance such as black may be applied to at least the surface of the frame 2c. Alternatively, the frame 2c may be surface-treated to reduce the light reflectance, e.g., by forming many fine projections and depressions on the surface.

Figure 3A:
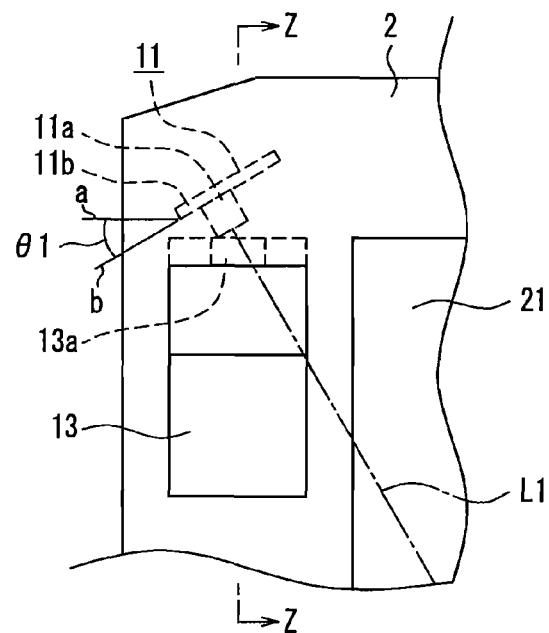
FIG. 3A is a front view of the main portion in the vicinity of a light source body.
Figure 3B:
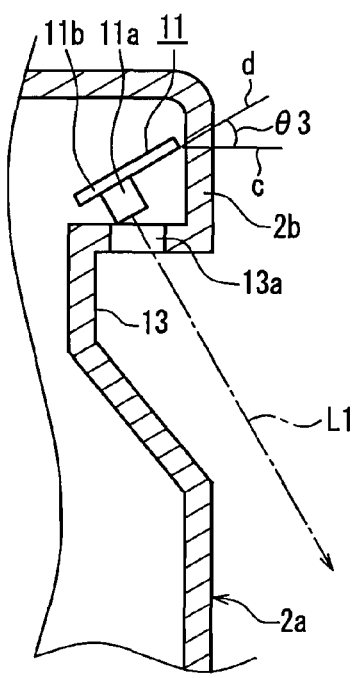
FIG. 3B is a cross-sectional view taken along the line Z-Z in FIG. 3A

FIG. 3A is a front view of the main portion in the vicinity of the light source body 11 of the second case 2. FIG. 3B is a cross-sectional view taken along the line Z-Z in FIG. 3A. As shown in FIGS. 3A and 3B, the light source body 11 includes an LED element 11a and a substrate 11b. The LED element (light source) 11a is mounted on the substrate 11b. A hole (opening) 13a is formed in the inner surface of the recess 13 on the light source body 11 side. A cover portion 2b, which is a part of the second case 2, covers at least a portion of the LED element 11a that is oriented in the same direction as the display surface of the liquid crystal display 21. As shown in FIG. 3A, when the principal surface 2a of the second case 2 is viewed from the front, the light source body 11 is placed inside the second case 2 so that the mounting surface of the LED element 11a is inclined with respect to the axial direction of the shaft 3a (see FIG. 2) held by the hinges 3. Specifically, in FIG. 3A, when a line a is defined as parallel to the shaft 3a and a line b is defined as parallel to the mounting surface of the LED element 11a on the substrate 11b, the light source body 11 is placed with the substrate 11b being inclined at an angle θ1 between the lines a and b. Moreover, as shown in FIG. 3B, the LED element 11a of the light source body 11 also is inclined with respect to the plane direction of the principal surface 2a of the second case 2. Specifically, in FIG. 3B, when a line c is defined as perpendicular to the principal surface 2a and a line d is defined as parallel to the mounting surface of the LED element 11a on the substrate 11b, the light source body 11 is placed with the substrate 11b being inclined at an angle θ3 between the lines c and d. Thus, the light that is emitted from the LED element 11a and has the optical axis L1 illuminates the central portion of the keyboard 5 through the hole 13a.

Figure 3C:
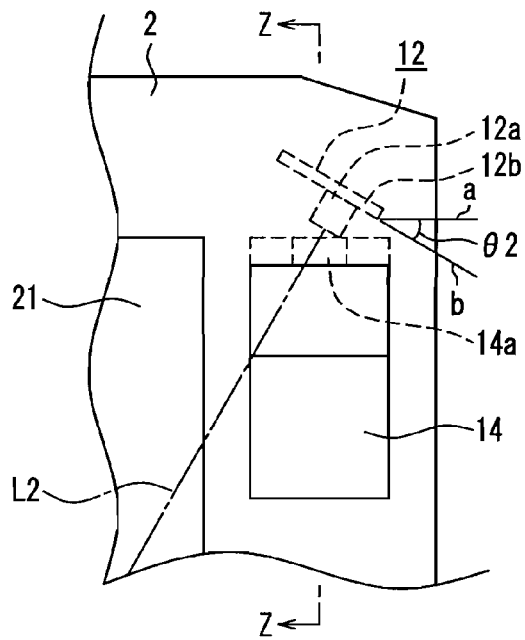
FIG. 3C is a front view of the main portion in the vicinity of a light source body.
Figure 3D:
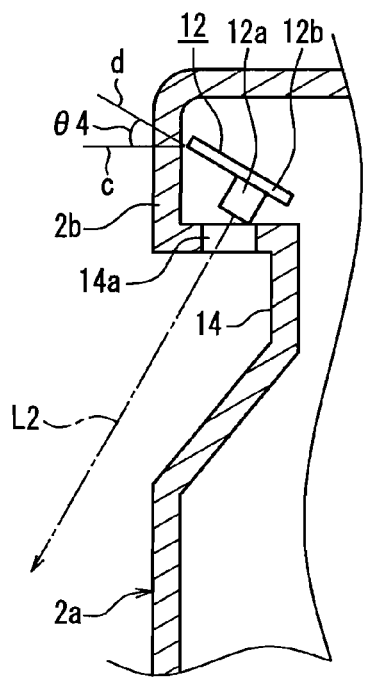
FIG. 3D is a cross-sectional view taken along the line Z-Z in FIG. 3C.

FIG. 3C is a front view of the main portion in the vicinity of the light source body 12 of the second case 2. FIG. 3D is a cross-sectional view taken along the line Z-Z in FIG. 3C. As shown in FIGS. 3C and 3D, the light source body 12 includes an LED element 12a and a substrate 12b. The LED element (light source) 12a is mounted on the substrate 12b. A hole (opening) 14a is formed in the inner surface of the recess 14 on the light source body 12 side. A cover portion 2b, which is a part of the second case 2, covers at least a portion of the LED element 12a that is oriented in the same direction as the display surface of the liquid crystal display 21. As shown in FIG. 3C, when the principal surface 2a of the second case 2 is viewed from the front, the light source body 12 is placed inside the second case 2 so that the mounting surface of the LED element 12a is inclined with respect to the axial direction of the shaft 3a (see FIG. 2) held by the hinges 3. Specifically, in FIG. 3C, when a line a is defined as parallel to the shaft 3a and a line b is defined as parallel to the mounting surface of the LED element 12a on the substrate 12b, the light source body 12 is placed with the substrate 12b being inclined at an angle θ2 between the lines a and b. Moreover, as shown in FIG. 3D, the LED element 12a of the light source body 12 also is inclined with respect to the plane direction of the principal surface 2a of the second case 2. Specifically, in FIG. 3D, when a line c is defined as perpendicular to the principal surface 2a and a line d is defined as parallel to the mounting surface of the LED element 12a on the substrate 12b, the light source body 12 is placed with the substrate 12b being inclined at an angle θ4 between the lines c and d. Thus, the light that is emitted from the LED element 12a and has the optical axis L2 illuminates the central portion of the keyboard 5 through the hole 14a.

Figure 4:
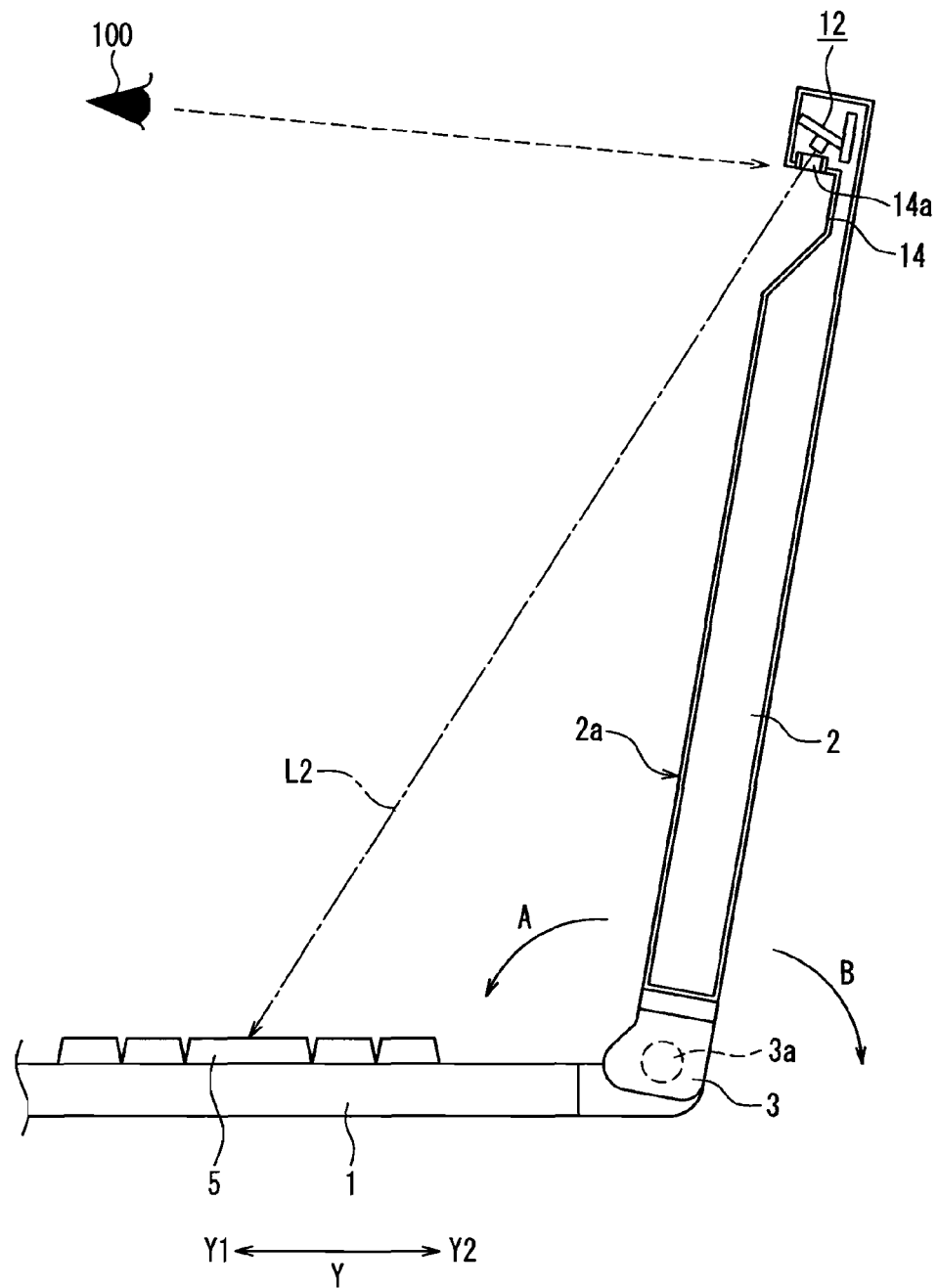
FIG. 4 is a cross-sectional view taken along the line Z-Z in FIG. 2.

FIG. 4 is a cross-sectional view taken along the line Z-Z in FIG. 2. For clarification, FIG. 4 illustrates only a part of the second case 2. Moreover, FIG. 4 illustrates only a portion of the first case 1 in which the keyboard 5 is arranged. As shown in FIG. 4, the LED element 12a of the light source body 12 also is inclined with respect to the plane direction of the principal surface 2a of the second case 2. Therefore, the light emitted from the LED element 12a illuminates the central portion of the keyboard 5 in the Y-axis direction, as represented by the optical axis L2. Although not shown in FIG. 4, the LED element 11a of the light source body 11 also is placed in the second case 2 and inclined in the same direction as shown in FIG. 4 for the light source body 12. Therefore, the light emitted from the LED element 11a illuminates the central portion of the keyboard 5 in the Y-axis direction.

Figure 5:
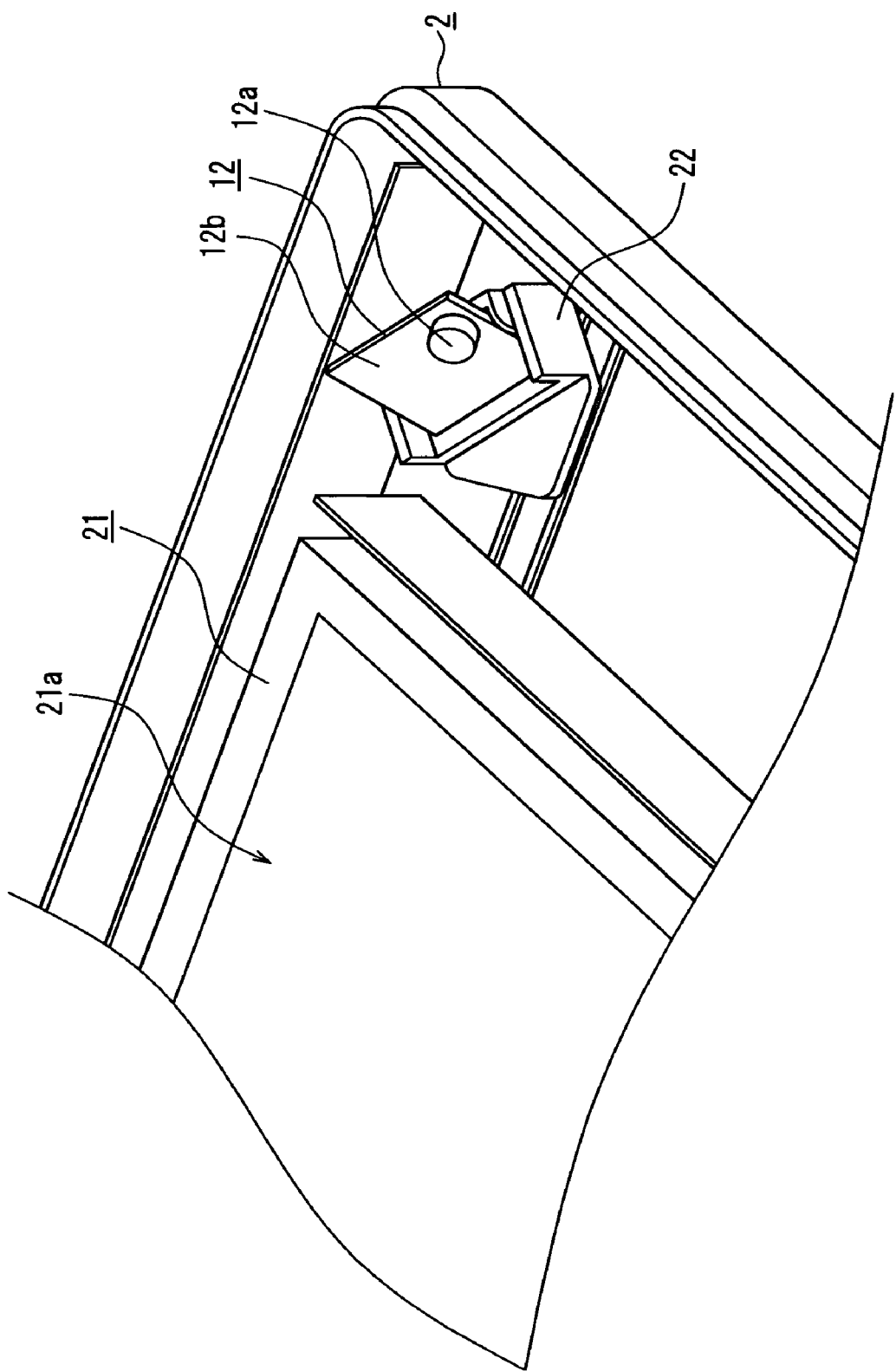
FIG. 5 is a perspective view of the main portion in the vicinity of a light source body.

FIG. 5 is a perspective view of the main portion in the vicinity of the light source body 12 in the second case 2. In FIG. 5, the portion constituting the principal surface 2a of the second case 2 is omitted to clarify the inside of the second case 2. As shown in FIG. 5, the light source body 12 is placed in the second case 2 so that the substrate 12b is inclined with respect to both the predetermined directions. Although not shown in FIG. 5, the light source body 11 also is placed in the second case 2 so that the substrate 11b is inclined with respect to both the predetermined directions.

Hereinafter, the operations in turning on the LED elements 11a, 12a of the light source bodies 11, 12 will be described.

When the LED element 11a of the light source body 11 is turned on, the light emitted from the LED element 11a illuminates the central portion of the keyboard 5 in the width direction (X-axis direction), as represented by the optical axis L1 in FIG. 2. When the LED element 12a of the light source body 12 is turned on, the light emitted from the LED element 12a illuminates the central portion of the keyboard 5 in the width direction (X-axis direction), as represented by the optical axis L2 in FIG. 2. Moreover, the light emitted from the LED element 12a illuminates the central portion of the keyboard 5 in the depth direction (Y-axis direction), as represented by the optical axis L2 in FIG. 4. Similarly, the light emitted from the LED element 11a also illuminates the central portion of the keyboard 5 in the depth direction (Y-axis direction). Accordingly, the light emitted from the light source bodies 11, 12 can illuminate the central portion of the keyboard 5 brightly. As described above, the light of the LED element 11a having the optical axis L1 illuminates the keyboard 5 in the width direction (X-axis direction), and the light of the LED element 12a having the optical axis L2 illuminates the keyboard 5 in the width direction (X-axis direction). Therefore, the optical axes L1, L2 are not likely to enter the visual angle of a user directly. For example, even if the LED elements 11a, 12a of the light source bodies 11, 12 are turned on in a dark place, it is possible to avoid dazzling the eyes of the user.

In this embodiment, as shown in FIG. 2, the light source body 11 is located on the left-hand side of the liquid crystal display 21 and the light source body 12 is located on the right-hand side of the liquid crystal display 21. Therefore, the light emitted from the LED element 11a of the light source body 11 is reflected toward the light source body 12 and the light emitted from the LED element 12a of the light source body 12 is reflected toward the light source body 11, as represented by the optical axes L3 and L4, respectively. Thus, when the user uses the notebook computer in a normal posture (in which the user sees the liquid crystal display 21 from the position opposite the substantial center of the liquid crystal display 21 in the X-axis direction), the light reflected from a key top of the keyboard 5 also is not likely to reach the eyes of the user.

When the second case 2 is rotated from the position shown in FIG. 4 in the direction of the arrow B, the point on the keyboard 5 that the optical axis L2 reaches is moved in the direction of the arrow Y1 (this is true for the optical axis L1, although not shown in FIG. 4). Moreover, when the second case 2 is rotated from the position shown in FIG. 4 in the direction of the arrow A, the point on the keyboard 5 that the optical axis L2 reaches is moved in the direction of the arrow Y2 (this is true for the optical axis L1, although not shown in FIG. 4). In this embodiment, the light source bodies 11, 12 are placed so that when the rotation angle of the second case 2 relative to the first case 1 is in a practical range (about 90 to 130 degrees), the points that the optical axes L1, L2 reach do not deviate significantly from the keyboard 5.

The angles θ1, θ2 are preferably in the range of 10 to 30 degrees and set to, e.g., 25 degrees in this embodiment. The angles θ3, θ4 are preferably in the range of 20 to 30 degrees and set to, e.g., 25 degrees in this embodiment. The angles θ1 to θ4 are defined so that the light emitted from the LED elements 11a, 12a of the light source bodies 11, 12 illuminates the keyboard 5 when the aspect ratio of the effective display area of the liquid crystal display 21 is 4:3, and the rotation angle of the second case 2 relative to the first case 1 is in the practical range of 90 to 130 degrees.

Figure 6:
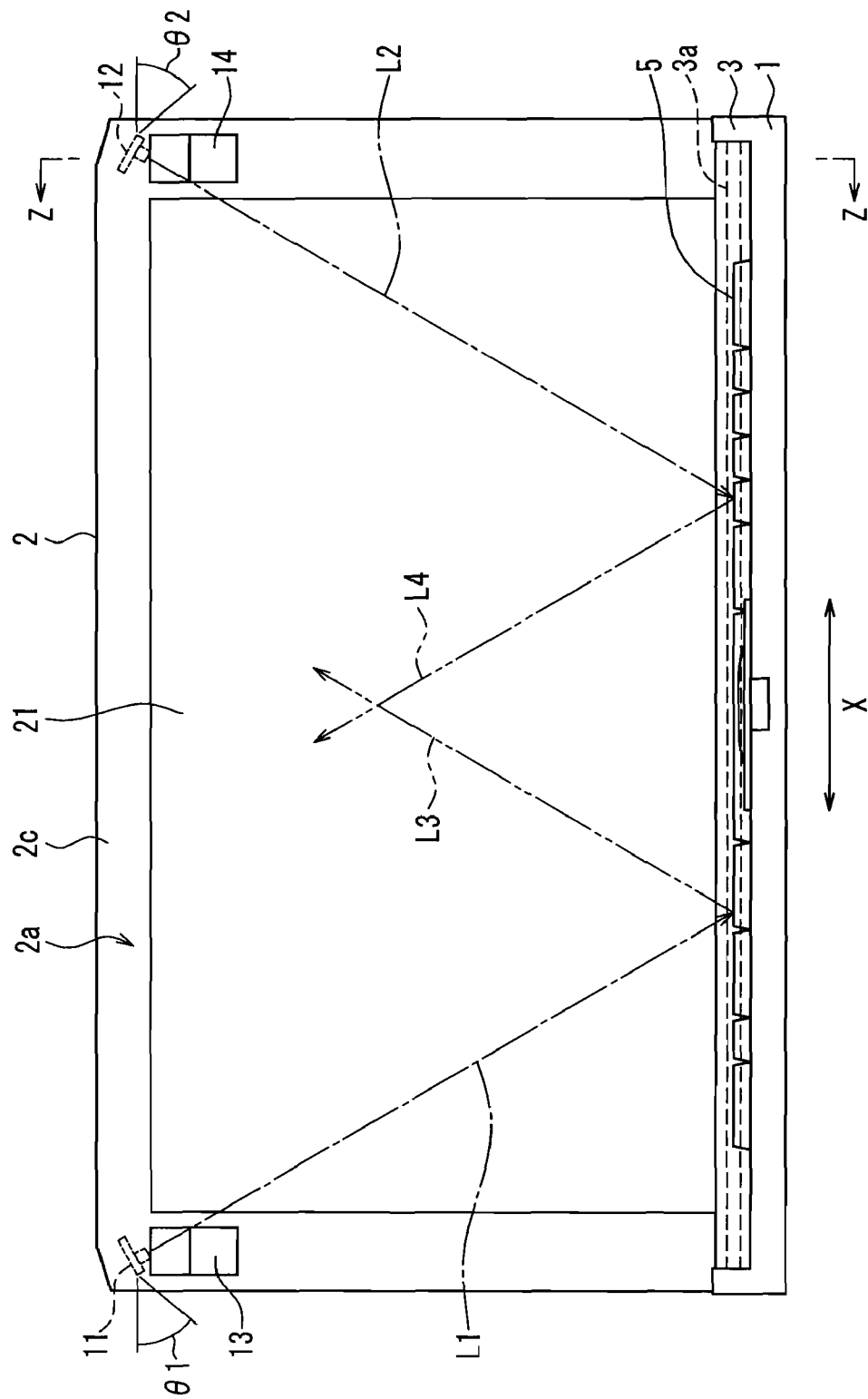
FIG. 6 is a front view of a notebook computer with a liquid crystal display having an aspect ratio of 16:9.

FIG. 6 is a front view of a notebook computer with a liquid crystal display having an aspect ratio of 16:9 for the effective display area. The liquid crystal display 21 shown in FIG. 6 is the same in size in the vertical direction as the liquid crystal display 21 shown in FIG. 2, but larger in size in the lateral direction than the liquid crystal display 21 shown in FIG. 2. As shown in FIG. 6, when the aspect ratio of the effective display area of the liquid crystal display 21 is 16:9, the angles θ1, θ2 are preferably in the range of 20 to 40 degrees and set to 35 degrees in FIG. 6. As shown in FIG. 6, a distance between the light source bodies 11, 12 becomes larger in the case of the aspect ratio of 16:9 (FIG. 6) than in the case of the aspect ratio of 4:3 (FIG. 2). Therefore, if the angles θ1, θ2 are the same values as those in the case of the aspect ratio of 4:3 (i.e., 25 degrees in this embodiment), the points on the keyboard 5 that the optical axes L1, L2 reach are spaced from the center of the keyboard 5. In this case, when the amount of light is sufficient at both ends of the keyboard 5 and insufficient in the central portion of the keyboard 5, the points on the keyboard 5 that the optical axes L1, L2 reach can be shifted to the positions closer the center of the keyboard 5 by increasing the values of the angles θ1, θ2. In the configuration shown in FIG. 6, the angles θ1, θ2 are 35 degrees so as to make the positions of the points on the keyboard 5 that the optical axes L1, L2 reach substantially the same as those of the points on the keyboard 5 that the optical axes L1, L2 reach in FIG. 2. The angles θ3, θ4 are preferably in the range of 20 to 30 degrees and set to 25 degrees in FIG. 6, similarly to the configuration shown in FIG. 2.

Figure 7:
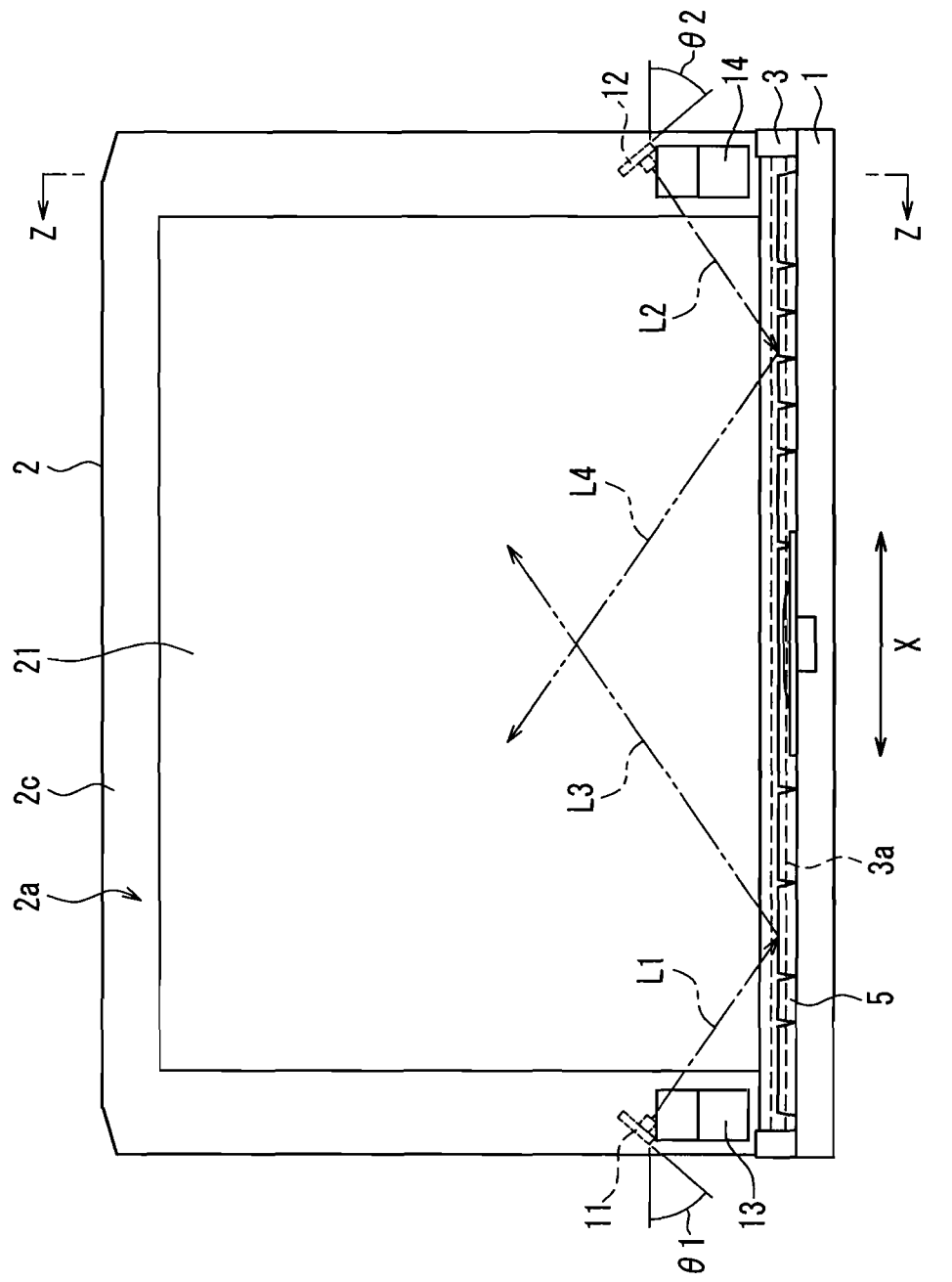
FIG. 7 is a front view of a notebook computer including light source bodies that are located on the lower side of the principal surface of a second case.
Figure 8:
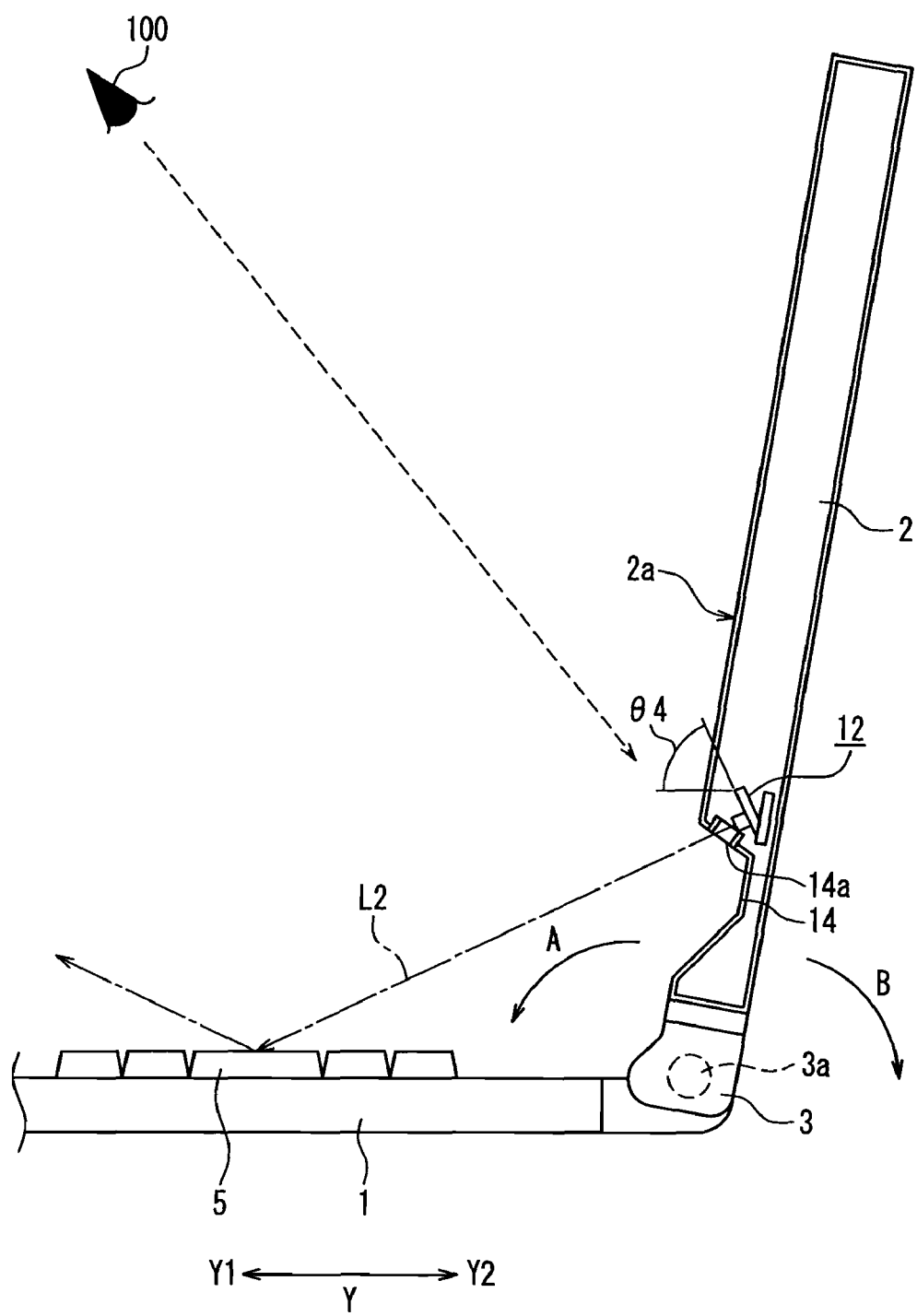
FIG. 8 is a cross-sectional view taken along the line Z-Z in FIG. 7.

In this embodiment, the light source body 11 is located near the corner where the second long side portion and the left-hand short side portion of the second case 2 join, as shown in FIG. 2. However, as shown in FIG. 7, the light source body 11 may be located near the corner where the first long side portion (supported by the shaft 3a) and the left-hand short side portion of the second case 2 join. The light source body 12 also may be located near the corner where the first long side portion and the right-hand short side portion of the second case 2 join, as shown in FIG. 7. FIG. 8 is a cross-sectional view taken along the line Z-Z in FIG. 7. When the light source bodies 11, 12 are located at the positions shown in FIGS. 7 and 8, the angles θ1, θ2 (see FIG. 7) are preferably in the range of 20 to 50 degrees and set to 45 degrees in this embodiment. The angles θ3, θ4 (for convenience, only the angle θ4 is shown in FIG. 8) are preferably in the range of 30 to 60 degrees and set to 60 degrees in this embodiment. With this configuration, the LED elements 11a, 12a of the light source bodies 11, 12 can illuminate the keyboard 5. Moreover, since the angles between the surface of the keyboard 5 and each of the optical axes L1, L2 are smaller in FIG. 7 than in FIG. 2, the irradiation area of the keyboard 5 becomes larger. The mounting angles of the LED elements 11a, 12a are defined so that the light emitted from the LED elements 11a, 12a illuminates the keyboard 5 when the rotation angle of the second case 2 relative to the first case 1 is in the range of 90 to 130 degrees. As described above, even if the light source bodies 11, 12 are located at the positions shown in FIGS. 7 and 8, the keyboard 5 can be irradiated with the light emitted from the LED elements 11a, 12a. As shown in FIG. 8, the light source bodies 11, 12 are placed inside the second case 2 and illuminate the keyboard 5 through the holes 13a, 14a, respectively. Therefore, the light emitted from the LED elements 11a, 12a does not enter the user's vision directly, and the user is hardly dazzled.

The light source bodies 11, 12 may be located at any positions between the positions shown in FIG. 2 (near the second long side portion of the second case 2) and the positions shown in FIG. 7 (near the first long side portion of the second case 2). In this case, the mounting angles θ1 to θ4 of the LED elements 11a, 12a are set to desired values within the above numerical ranges, and thus the LED elements 11a, 12a can illuminate the keyboard 5.

3. Effect of Embodiment and Others

In this embodiment, the light source body 11 is located on the left-hand side of the liquid crystal display 21 and the light source body 12 is located on the right-hand side of the liquid crystal display 21. Therefore, the light emitted from the LED elements 11a, 12a of the light source bodies 11, 12 is not likely to reach the eyes of a user directly. When a light source is placed in the vicinity of the center of the liquid crystal display, as disclosed in Patent Document 1, the light emitted from the light source often enters the user's vision while the user sees the liquid crystal display. This may interfere with the work using the notebook computer. In this embodiment, the light source bodies 11, 12 are located away from the center of the liquid crystal display 21. Accordingly, the light emitted from the LED elements 11a, 12a of the light source bodies 11, 12 is not likely to enter the user's vision while the user sees the liquid crystal display 21. Thus, the user is hardly dazzled by the light source bodies 11, 12 and can perform the input operation of the keyboard 5 in a dark place or the like.

Since the light source body 11 is located on the left-hand side of the liquid crystal display 21 and the light source body 12 is located on the right-hand side of the liquid crystal display 21, the light emitted from the LED element 11a of the light source body 11 is reflected from a key top of the keyboard 5 toward the light source body 12 and the light emitted from the LED element 12a of the light source body 12 is reflected from a key top of the keyboard 5 toward the light sources body 11. Consequently, the light emitted from the LED elements 11a, 12a is not likely to be reflected toward the user positioned opposite the liquid crystal display 21. Therefore, the reflected light can be prevented from entering the user's vision while the user sees the liquid crystal display 21. Thus, the user is hardly dazzled by the light source bodies 11, 12 and can operate the keyboard 5 in a dark place or the like.

In this embodiment, the second case 2 contains the light source bodies 11, 12, and the light emitted from the light source bodies 11, 12 illuminates the keyboard 5 through the holes 13a, 14a, respectively. Therefore, the light of the LED elements 11a, 12a can be prevented from entering the user's vision directly while the user sees the liquid crystal display 21. Thus, the user is hardly dazzled by the light source bodies 11, 12 and can perform the input operation of the keyboard 5 in a dark place or the like.

In this embodiment, the light source bodies 11, 12 include the LED elements 11a, 12a that emit red light, respectively. Thus, the eyes of the user can adapt to a dark place easily, since the color of light emitted from the red LED does not interfere with the dark adaptation.

In this embodiment, the holes 13a, 14a are formed in the recesses 13, 14, respectively. Therefore, it is possible to prevent the unwanted diffusion of light emitted from the LED elements 11a, 12a of the light source bodies 11, 12.

In this embodiment, it is preferable that a color material having a low light reflectance such as black, which can be applied, e.g., to the frame 2c of the second case 2, is applied to the surface of each of the recesses 13, 14. Alternatively, it is preferable that the recesses 13, 14 are surface-treated to reduce the light reflectance, e.g., by forming many fine projections and depressions on the surface. Such a configuration can prevent the light that has been emitted from the LED elements 11a, 12a of the light source bodies 11, 12 and passed through the holes 13a, 14a from being reflected from the surfaces of the recesses 13, 14, respectively. Therefore, the reflected light further can be prevented from entering the user's vision. Moreover, the frame 2c may be provided on the surfaces of the recesses 13, 14.

It is also preferable that the periphery of each of the holes 13a, 14a is made to have a color of low light reflectance such as black or is surface-treated to reduce the light reflectance, e.g., by forming many fine projections and depressions on the surface. Such a configuration can prevent the light that has been emitted from the LED elements 11a, 12a of the light source bodies 11, 12 and passed through the holes 13a, 14a from being reflected from the surfaces of the peripheries of the holes 13a, 14a, respectively.

The light source used for the light source bodies 11, 12 is not limited to the light-emitting diode and can be any light source as long as it includes at least an element that emits light. The color of light emitted from the light source bodies 11, 12 is not limited to red and can be white or blue.

In this embodiment, the light source bodies 11, 12 are placed inside the second case 2 near the holes 13a, 14a, respectively. However, the light source bodies 11, 12 may be placed inside the holes 13a, 14a, respectively, as long as the same effect as that in this embodiment can be obtained.

The first case 1 in this embodiment is an example of the first case of the present invention. The second case 2 in this embodiment is an example of the second case of the present invention. The keyboard 5 in this embodiment is an example of the input portion of the present invention. The liquid crystal display 21 in this embodiment is an example of the display portion of the present invention. The light source bodies 11, 12 in this embodiment are examples of the light source bodies each of which includes a light source that emits light by itself of the present invention. The cover portion 2 in this embodiment is an example of the cover portion of the present invention. The holes 13a, 14a in this embodiment are examples of the openings of the present invention.

The present invention is useful for equipment including a light source that allows a user to operate a operating means in a dark place or the like.

The following notes are disclosed with respect to this embodiment.

(Note 1)

An electronic apparatus comprising:

a first case comprising an input portion and a signal processing portion that processes an input signal received by the input portion;

a second case comprising a display panel that is capable of displaying visible information obtained by converting the input signal into a visible information signal in the signal processing portion, and a frame that defines an effective display area of the display panel; and hinges having a rotation axis for rotatably supporting the first case and the second case, wherein at least a pair of openings parallel to the rotation axis are provided in the frame, and at least a pair of light sources capable of illuminating the input portion are provided near or inside the pair of openings in the second case.

(Note 2)

The electronic apparatus according to note 1, wherein the light sources are placed inside the second case at positions in which the light sources can illuminate the input portion.

(Note 3)

The electronic apparatus according to note 1 or 2, wherein light emitted from the light sources illuminates at least the input portion when a rotation angle of the second case is in a range in which a user that operates the input portion can see the display panel.

(Note 4)

The electronic apparatus according to any one of notes 1 to 3, wherein each of the light sources comprises a light-emitting diode that emits red light.

portions when the grip is at the extended position, respectively.

(Note 5)

An electronic apparatus comprising:

a first case comprising an input portion and a signal processing portion that processes an input signal received by the input portion;

a second case comprising a display panel that is capable of displaying visible information obtained by converting the input signal into a visible information signal in the signal processing portion, and a frame that defines an effective display area of the display panel; and hinges having a rotation axis for rotatably supporting the first case and the second case, wherein at least a pair of openings parallel to the rotation axis are provided in the frame, and at least a pair of light sources capable of illuminating the input portion are provided near or inside the pair of openings in the second case, and wherein the second case comprises a cover portion for covering at least a portion of each of the light sources that is oriented in the same direction as a display surface of the display panel.

(Note 6)

The electronic apparatus according to note 5, wherein the light sources are placed inside the second case at positions in which the light sources can illuminate the input portion.

(Note 7)

The Electronic Apparatus According to Note 5 or 6, Wherein Light Emitted from the light sources illuminates at least the input portion when a rotation angle of the second case is in a range in which a user that operates the input portion can see the display panel.

(Note 8)

The electronic apparatus according to note 5 or 6, wherein each of the light sources comprises a light-emitting diode that emits red light.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic apparatus comprising:

a first case comprising an input portion and a signal processing portion that processes an input signal received by the input portion;

a second case comprising a display panel that is capable of displaying visible information obtained by converting the input signal into a visible information signal in the signal processing portion, and a frame that defines an effective display area of the display panel; and hinges having a rotation axis for rotatably supporting the first case and the second case, wherein at least a pair of openings parallel to the rotation axis are provided in the frame, and at least a pair of light sources are placed inside of the second case at positions at which the light sources can illuminate the input portion through the pair of openings.

2. The electronic apparatus according to claim 1, wherein light emitted from the light sources illuminates at least the input portion when a rotation angle of the second case is in a range in which a user that operates the input portion can see the display panel.

3. The electronic apparatus according to claim 1, wherein each of the light sources comprises a light-emitting diode that emits red light.

4. The electronic apparatus according to claim 1, wherein the second case comprises a cover portion for covering at least a portion of each of the light sources that is oriented in the same direction as a display surface of the display panel.

5. The electric apparatus according to claim 1, wherein the light sources are located on both sides of the display panel and are inclined so as to illuminate the input portion.

6. The electronic apparatus according to claim 1, wherein the light sources are placed inside the frame at the positions in which the light sources can illuminate the input portion.

* * * * *